(12) United States Patent
Narita (10) Patent No.: US 11,650,776 B2
(45) Date of Patent: May 16, 2023

(54) NON-TRANSITORY COMPUTER-READABLE RECORDING MEDIUM, AND PRINTING SYSTEM

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/560,561

(22) Filed: Dec. 23, 2021

(65) Prior Publication Data
US 2022/0206727 A1    Jun. 30, 2022

(30) Foreign Application Priority Data

Dec. 24, 2020    (JP) .............................. JP2020-214614

(51) Int. Cl.
G06F 3/12    (2006.01)
(52) U.S. Cl.
CPC .......... *G06F 3/1255* (2013.01); *G06F 3/1207* (2013.01); *G06F 3/1208* (2013.01); *G06F 3/1256* (2013.01); *G06F 3/1204* (2013.01)
(58) Field of Classification Search
CPC .... G06F 3/1255; G06F 3/1207; G06F 3/1208; G06F 3/1256; G06F 3/1205; G06F 3/1232; G06F 3/1285; G06F 3/1204
USPC ........................................................ 358/1.14
See application file for complete search history.

(56) References Cited

U.S. PATENT DOCUMENTS

| | | | |
|---|---|---|---|
| 2001/0007619 A1* | 7/2001 | Kakutani | G06K 15/16 400/582 |
| 2016/0224293 A1 | 8/2016 | Nakagawa | |
| 2019/0049890 A1* | 2/2019 | Sugiura | G03G 15/2064 |
| 2020/0310720 A1 | 10/2020 | Kakitsuba | |

FOREIGN PATENT DOCUMENTS

| | | |
|---|---|---|
| JP | 2010-205019 A | 9/2010 |
| JP | 2007-011946 A | 1/2017 |

OTHER PUBLICATIONS

International Search Report and Written Opinion dated Mar. 8, 2022 issued in the PCT counterpart application No. PCT/2021/047900.

\* cited by examiner

*Primary Examiner* — Darryl V Dottin
(74) *Attorney, Agent, or Firm* — Scully, Scott, Murphy & Presser, PC (57) ABSTRACT

A supporting program causes a computer of an information processing device to display a setting screen for receiving an input operation of print settings, and acquire sheet information representing information of a sheet a printer uses for printing. Further, when there is a print instruction output from an application program and instructing a general-use printing program implemented, in advance, in an operating system, to perform printing of an image, the computer performs acquiring sheet information included in the print settings and determining suitability of a sheet by comparing the sheet information acquired from the printer with the sheet information of the print settings. The computer displays a warning message for a user when it is determined that the sheet is unsuitable.

13 Claims, 4 Drawing Sheets

NON-TRANSITORY COMPUTER-READABLE RECORDING MEDIUM, AND PRINTING SYSTEM

CROSS-REFERENCE TO RELATED APPLICATIONS

This application claims priority under 35 U.S.C. § 119 from Japanese Patent Application No. 2020-214614 filed on Dec. 24, 2020. The entire subject matter of the application is incorporated herein by reference.

BACKGROUND ART

The technical fields disclosed herein relate to a non-transitory computer-readable recording medium containing instructions realizing a supporting program and printing systems that support a control of printers.

As a technology to control a printer from an information processing device such as a personal computer, it is widely known a configuration in which a printer driver obtains print settings and generates print data based on the obtained print settings. For example, there has been known a technology of comparing a sheet size detected by the printer with a sheet size set by an application to detect mismatch therebetween.

SUMMARY

In recent years, a technology of controlling printers by a printing program that is built into an operating system (OS) as a standard feature, without using a printer driver described above, has been put into practical use. In this technology, the OS associates the printer with the printing program built into the OS as the standard feature, and thereafter, when printing instructions for the printer are received, printing can be performed by the printing program built into the OS as the standard without using a printer driver.

When the above-mentioned general-use printing program built in the OS as the standard feature is used for printing, a conventional printer driver cannot be used for printing. Therefore, some of functions provided by the printer driver will no longer be supported. For example, the OS-standard general-use printing program does not support the above-mentioned function of detecting suitability between sheet information on the information processing device side and sheet information on the printer side. This makes it difficult to take appropriate measures against sheet information mismatch. As a result, the user may notice after printing that the print result is not what the user intended, such as the image protruding from the sheet.

According to aspects of the present disclosure, there is provided a non-transitory computer-readable recording medium for an information processing device which includes a memory and a computer. A printer is connected to the information processing apparatus. The non-transitory computer-readable recording medium containing computer-executable instructions realizing a supporting program corresponding to the printer connected to the information processing apparatus. The supporting program can cause the computer to perform a setting screen displaying process of displaying a setting screen for receiving an input operation of print settings using a user interface of the information processing device, and, in response to displaying of the setting screen in the setting screen displaying process, a first acquisition process of acquiring, from the printer, first sheet information representing information of a sheet the printer uses for printing. When there is a print instruction output from an application program implemented in the information processing device and instructing a general-use printing program implemented, in advance, in an operating system of the information processing device, to perform printing of an image, the supporting program can cause the computer to perform a second acquisition process of acquiring second sheet information included in the print settings for the print instruction and representing information of a sheet included in the print settings, and a determining process of determining suitability of a sheet by comparing the first sheet information acquired in the first acquisition process with the second sheet information acquired in the second acquisition process. When it is determined in the determining process that the sheet is unsuitable, the supporting program can cause the computer to perform a warning process of performing a process for warning using the user interface.

DETAILED DESCRIPTION OF THE EMBODIMENT

Hereinafter, a personal computer (hereinafter referred to as a "PC") using a supporting program according to the present embodiment will be described in detail with reference to the accompanying drawings. The present specification discloses a printing system including a printer having a printing function and a supporting program executed on a PC connected to the printer.

Figure 1:
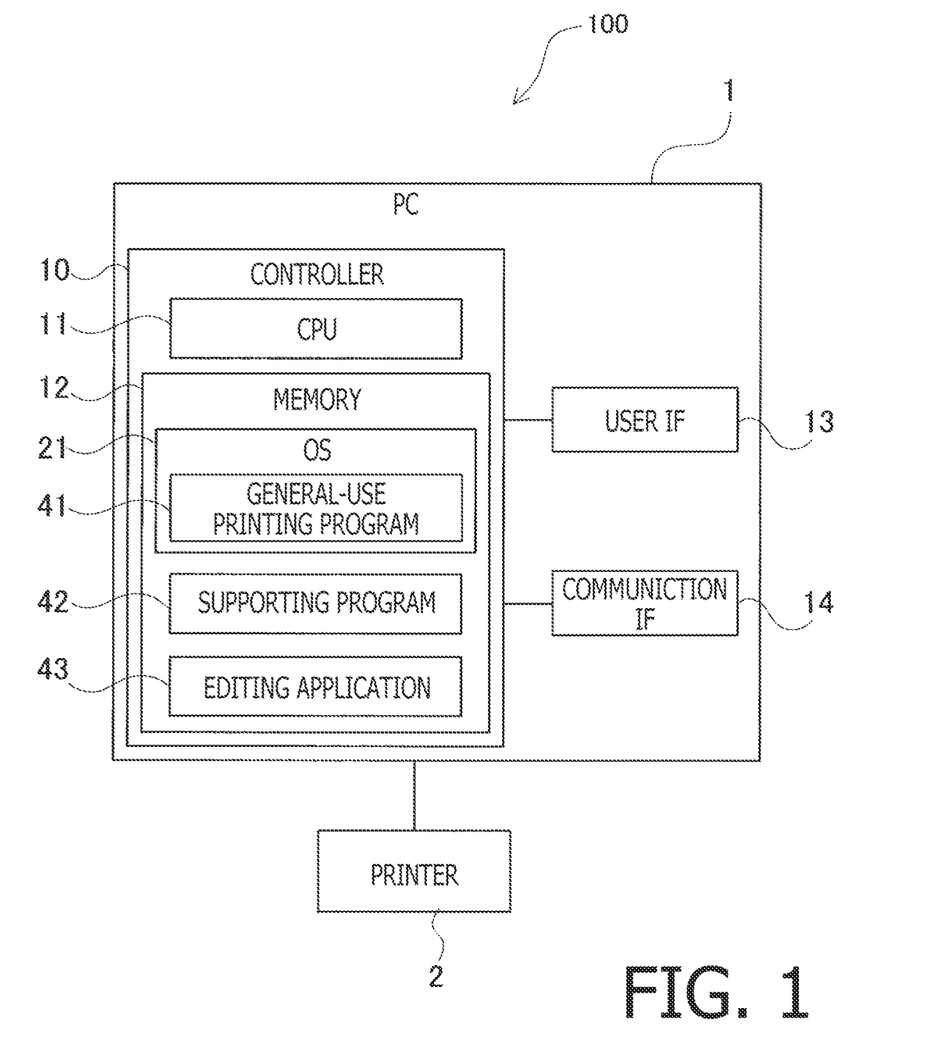
FIG. 1 shows a block diagram showing an electrical configuration of a PC.

The printing system 100 according to the present embodiment includes a PC 1 and a printer 2 as shown in FIG. 1. The PC 1 is an example of an information processing device. The printer 2 is a device having a printing function. The PC 1 and the printer 2 are communicably connected. The printer 2 according to the present embodiment is configured to receive, for example, print data from the PC 1 or the like, and execute printing based on the received print data.

The PC 1 according to the present embodiment has, as shown in FIG. 1, a controller 10 including a CPU 11 and a memory 12. The CPU 11 is an example of a computer. Further, the PC 1 is provided with a user interface (hereinafter referred to as a "user IF") 13 and a communication interface (hereinafter referred to as a "communication IF") 14, which are electrically connected to the controller 10. It is noted that the controller 10 in FIG. 1 is a generic term including hardware and software used to control the PC 1, and does not necessarily represent a single piece of hardware that actually exists in the PC1.

The CPU 11 executes various processes in accordance with programs read from the memory 12 and based on user operations. The various programs and various data, including various application programs (hereinafter referred to as "applications"), are stored in the memory 12. The memory 12 is also used as a work area when various processes are executed. A buffer provided by the CPU 11 is also an example of a memory. One example of the memory 12 is not necessarily limited to a ROM, a RAM, an HDD, or the like built into the PC 1, but can also be a storage medium that is readable and writable by the CPU 11, such as a CD-ROM, a DVD-ROM, and the like.

The user IF 13 includes hardware for displaying a screen for informing the user of information and hardware for receiving operations by the user. It is noted that the user IF 13 may be a pair of a display capable of displaying information and a mouse, keyboard, or the like with an input acceptance function, or a touch panel with a display function and an input receiving function.

The communication IF 14 includes hardware for communicating with external devices such as the printer 2. A communication standard of the communication IF 14 is Ethernet (registered trademark), Wi-Fi (registered trademark), USB, and the like. The PC 1 may be equipped with multiple communication IF's 14 respectively corresponding to multiple communication standards.

The memory 12 of the PC 1 stores an operating system (hereinafter referred to as an "OS") 21 including a general-use printing program 41, a supporting program 42, and an editing application 43, as shown in FIG. 1. The supporting program 42 is an example of a supporting program. The editing application 43 is an example of an application program. The OS 21 is, for example, Windows (registered trademark), macOS (registered trademark), Linux (registered trademark), iOS (registered trademark), and Android (registered trademark).

The general-use printing program 41 is an OS standard program for causing various printers, such as the printer 2, to execute printing based on user instructions. The general-use printing program 41 according to the present embodiment is a program that includes a function to generate intermediate image data based on the image data to be printed.

The general-use printing program 41 supports functions that can be commonly used by multiple models of printers provided by various printer vendors. The general-use printing program 41 does not support all of the functions that are inherent to the various printers, and the functions it supports are limited to generic ones.

The supporting program 42 is a program or group of programs that accompanies the processing of the general-use printing program 41 and executes processing based on instructions from the OS 21, and is an application that supports the control of the target hardware. The supporting program 42 according to the present embodiment corresponds to the model of the printer 2 connected to the PC 1. For example, when an instruction to execute printing on the printer 2 is received using the general-use printing program 41, the supporting program 42 is launched by the general-use printing program 41. The supporting program 42 is called, for example, a hardware support application (which will be abbreviated as an HSA).

The supporting program 42 is capable of receiving multiple types of instructions from the general-use printing program 41 and executes various processes based on the received instructions. It is noted that the supporting program 42 may be a combination of a plurality of programs each of which is configured to receive an execution instruction, or a single program configured to execute different processes depending on the instructions.

The supporting program may be a program prepared for each type of printer by the vendor of the printer. For example, a supporting program for an inkjet printer and a supporting program for a laser printer may be prepared, respectively. The OS 21 of the PC 1 is configured such that, for example, when a new printer is connected to the PC 1, the OS 21 of the PC 1 downloads an appropriate supporting program from a server or the like according to the type of the connected printer and incorporates the same into the device itself. Then, the OS 21 stores the identification information of the incorporated supporting program in the memory 12, in association with the printer information of the newly connected printer. It is noted that the supporting program may be prepared not only for each printer type but also for each printer model or series of printer models.

The editing application 43 is, for example, an application for creating and editing image data and/or document data. The editing application 43 may be, for example, Word or PowerPoint made by Microsoft (registered trademark), or an application provided by a vendor of the printer 2. The editing application 43 is configured to receive user operations including instructions to cause the printer 2 to perform a particular operation. Concretely, the editing application 43 receives, via the user IF 13, for example, a print execution instruction to cause the printer 2 to perform printing.

Figure 2:
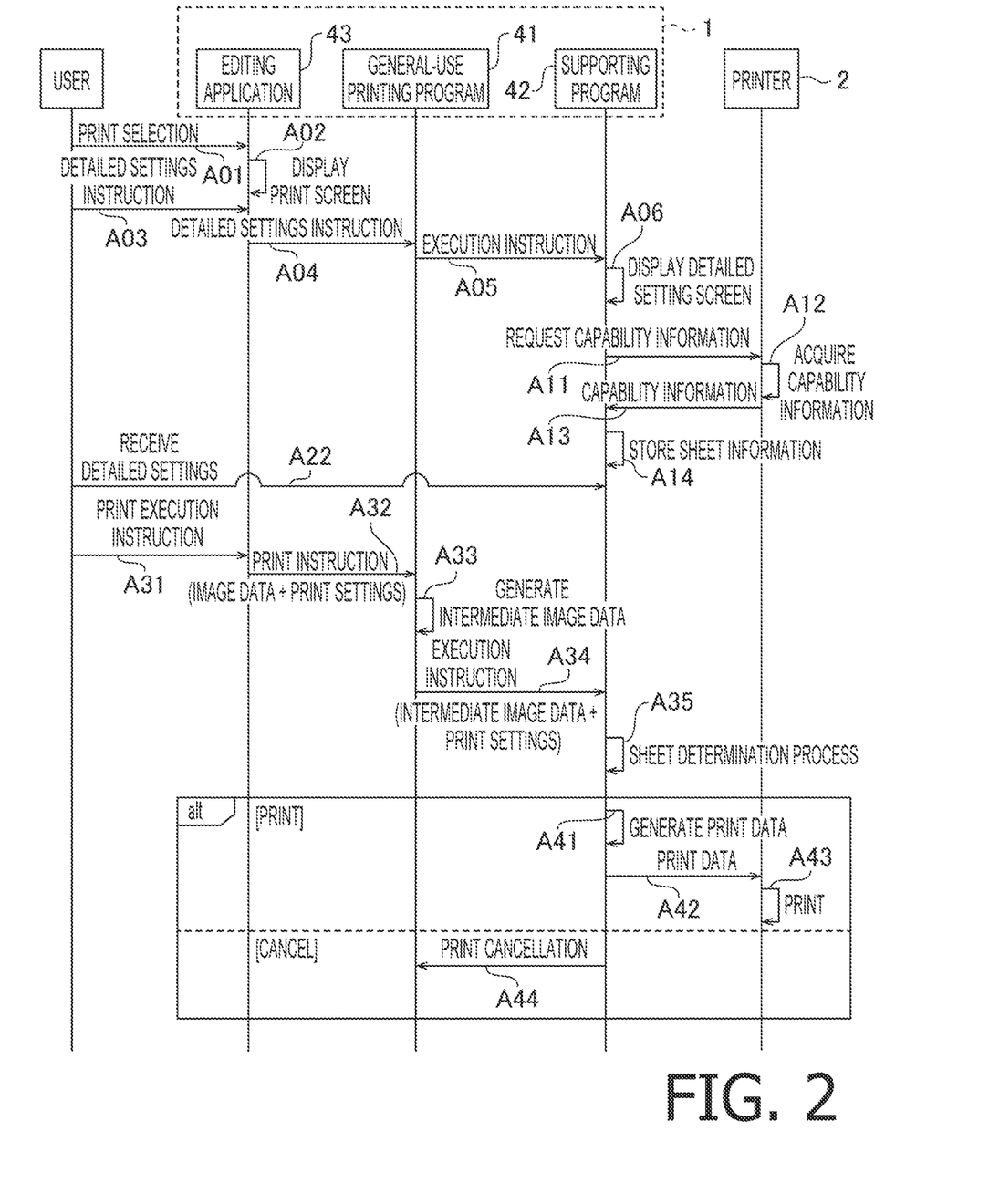
FIG. 2 is a sequence diagram showing an example of the printing operation procedure by each program.

Next, the procedure of printing including the operation of the supporting program 42 according to the present embodiment will be described with reference to a sequence diagram shown in FIG. 2. FIG. 2 shows the operation when a print execution instruction to print to the printer 2 using the general-use printing program 41 is received by an application that receives printing instructions such as an editing application 43, and when the supporting program 42 corresponding to the printer 2 is incorporated in the PC 1.

Each processing step in the processes and flowcharts according to the present embodiment basically indicates processing by the CPU 11 in accordance with instructions described in the programs such as the supporting program 42, and the like. The processing by the CPU 11 also includes hardware control using the API of the OS 21. In this specification, the operation of each program is described with the detailed description of the OS 21 being omitted. In addition, a term "acquisition" is used in a concept that does not require a request.

The editing application 43 is configured to receive creating and editing of texts, diagrams, and the like based on the instructions of the user. When the editing application 43 receives instructions for printing currently selected text or the like (A01), the editing application 43 displays a print screen, on the user IF 13, for receiving instructions by the user (A02). On the print screen, the editing application 43 receives, for example, instructions to execute printing, instructions for basic print settings, and instructions to start receiving detailed print settings.

When the editing application 43 receives the instruction to start receiving the detailed print settings with the printer 2 being selected on the print screen which is currently displayed (A03), the editing application 43 passes the information of the received detailed setting instruction to the OS 21. When the OS 21 receives the detailed setting instructions for printing using the general-use printing program 41, the OS 21 executes the general-use printing program 41 and passes the instructions to start receiving detailed printing settings to the general-use printing program 41 (A04). When the general-use printing program 41 receives the instruction to start receiving the detailed print settings, the general-use printing program 41 passes the instruction to execute receiving the detailed print settings to the supporting program 42 corresponding to the printer 2, which is the currently selected printer (A05).

The supporting program 42 starts operation based on an execution instruction from the general-use printing program 41, and displays a setting screen for receiving input operations of detailed print settings on the user IF 13 (A06). A06 is an example of a setting screen displaying process. The supporting program 42 is configured to, for example, display a screen for accepting detailed settings that can be supported based on the model information of the printer 2, and receive the user's operation.

After the supporting program 42 starts displaying the setting screen at A06, the supporting program 42 transmits an acquisition request requesting capability information to the printer 2 via the communication IF 14 (A11). When the printer 2 receives the acquisition request for capability information from the PC 1, or the like, the printer 2 acquires the capability information that indicates the capability of its own device (A12), and responds to the request by transmitting the acquired capability information to the device that has transmitted the request (A13). The capability information transmitted from the printer 2 includes, for example, status information, information on the remaining amount of consumables, information on the installed trays, sheet information on the sheet set for each tray, and information on the print resolutions that can be supported.

The printer 2 receives, for example, the sheet information of the sheet to be stored in the sheet feed tray of the printer 2 via the operation panel, and stores the received sheet information in the memory of the printer 2. In A12, the printer 2 retrieves the sheet information from the memory of the printer 2 itself. The sheet information retrieved from the memory of printer 2 includes, as an example, sheet size information and sheet type information. The printer 2 may be equipped with a plurality of sheet feed trays, and when equipped with a plurality of sheet feed trays, the sheet information is stored for each tray in association with the information indicating the tray. When the printer 2 has a sensor or the like that detects the sheet accommodated in the tray, the sheet information may be obtained based on an output signal of the sensor or the like.

The printer 2 may have a function to perform image processing based on the received print job and perform printing based on the data after the image processing, for example, aggregate printing such as Nin1, composite printing such as Watermark, and saving printing to save colorant. When the printer has functions for image processing that can be performed by the printer 2, the printer 2 may pass the information of the functions to the supporting program 42 as capability information.

In A13, the supporting program 42 acquires the capability information of the printer 2. The capability information acquired by the supporting program 42 includes the sheet information of the printer 2. A13 is an example of a first acquisition process, and the sheet information included in the capability information of printer 2 is an example of first sheet information. The sheet information includes, as an example, sheet size information and sheet type information.

The communication between the supporting program 42 and the printer 2 may be performed such that the supporting program 42 directly communicate with the printer 2 using the MIB (Management Information Base), for example, or the communication may be performed via the OS 21. When the communication is performed via the OS 21, the supporting program 42 and the printer 2 communicate according to the communication conventions of the OS 21, such as the IPP (internet printing protocol).

Based on the capability information acquired from the printer 2, the supporting program 42 stores the sheet information of the sheet set for each tray in an available area in the memory 12 that can be used by the supporting program 42 (A14). When the sheet size information contained in the sheet information acquired from the printer 2 indicates fixed sizes such as A4 size and the like, the supporting program 42 may convert the sheet size information into numerical values indicating the sheet length and sheet width and store the converted values.

In addition, the supporting program 42 receives instructions from the user on the setting screen for receiving detailed settings displayed in A06 (A22). The supporting program 42 may determine items, and the like, of the detailed settings that can be received based on the capability information obtained from the printer 2. When the supporting program 42 receives the instruction to terminate the detailed settings, the supporting program 42 closes the setting screen that was displayed in A06 and passes a termination notification to the general-use printing program 41. The general-use printing program 41 passes the termination notification to the editing application 43.

When the editing application 43 receives a print execution instruction by the user on the print screen (A31), the editing application 43 passes a print instruction to the general-use printing program 41 (A32). In response to the print instruction, the general-use printing program 41 obtains information indicating the image data to be printed and information indicating the print settings. The print settings include the sheet information. The sheet information included in the print settings also includes sheet size information and sheet type information.

The general-use printing program 41 generates intermediate image data by converting the format of the image data included in the received print instructions into the format of the intermediate image data (A33), and generates a print job including the intermediate image data. The image data included in the editing application 43 can be of various types, and the general-use printing program 41 converts the received image data into intermediate image data suitable for generating the print data. When the image data included in the print instruction is suitable for generating print data, the generation of intermediate image data may be omitted and the intermediate image data may be used as is. The intermediate image data is, for example, XPS data.

The general-use printing program 41 further outputs an execution instruction to the supporting program 42 (A34) to cause the supporting program 42 to operate. In the execution instructions, the generated intermediate image data and information on the print settings are passed to the supporting program 42. The print settings passed to the supporting program 42 include the sheet information. The sheet information included in the print settings also includes the sheet size information and the sheet type information. The general-use printing program 41 may include part of or all of the sheet information in the intermediate image data and pass the same to the supporting program 42.

The supporting program 42 executes the sheet determination process based on the execution instructions received from the general-use printing program 41 (A35). The sheet determination process determines suitability of the sheet by comparing the sheet information received from the general-use printing program 41 in A34 and the sheet information obtained from the printer 2 in A13, and determines whether to execute or cancel printing based on the determination result. The procedure of the sheet determination process will be described below.

When the editing application 43 does not receive the instruction to start receiving detailed print settings before receiving the instruction to execute printing in A31, the supporting program 42 does not execute A11 to A14 because the supporting program 42 has not received the instruction to execute A05 from the general-use printing program 41. In that case, the supporting program 42 may execute A11 to A14 before executing A35. Alternatively, the supporting program 42 may execute A11 to A14 before executing A35 if the sheet information is not stored in the memory of the device itself when the execution instruction is received in A34.

When the supporting program 42 determines that printing is to be executed in the sheet determination process of A35 (alt: [Print]), the supporting program 42 performs rasterization based on the intermediate image data received in A34 to generate print data indicating the image to be printed (A41). The print data generated in A41 is data in a format that can be used for printing on the printer 2, which is, for example, PDL data dedicated to the model of the printer 2.

Rasterizing with the supporting program 42 corresponding to the printer 2 allows a greater degree of freedom than when rasterizing with the general-use printing program 41, and is more likely to generate print data suitable for printing with the printer 2. It is noted that the print data generated by the supporting program 42 may be in a format that can be used for printing on printers of the models other than the model of the printer 2.

Instead of the supporting program 42 generating the print data, the general-use printing program 41 may generate the print data. In other words, when the supporting program 42 determines that printing is to be executed, the supporting program 42 may pass the information of printing execution to the general-use printing program 41. In that case, the general-use printing program 41 rasterizes the intermediate image data generated in A33 to generate the print data. Then, the general-use printing program 41 passes the generated print data to the supporting program 42.

The print data generated by the general-use printing program 41 is print data in a format that can be used for printing on various printers, such as PWGRaster data or PDF data. When the rasterization is performed by the general-use printing program 41, the processing of the supporting program 42 is reduced, it is expected to avoid an increase in processing time, and the program size of the supporting program 42 can be reduced.

The general-use printing program 41 may receive the result of the sheet determination process from the supporting program 42 without passing the intermediate image data to the supporting program 42. Then, when it is determined that printing is to be executed, the general-use printing program 41 may generate the print data.

After generating print data in A41, the supporting program 42 transmits the generated print data to the printer 2 together with a print command that instructs the execution of printing (A42). When the supporting program 42 receives the print data from the general-use printing program 41, the supporting program 42 transmits the print data received from the general-use printing program 41 to the printer 2 together with a print command that instructs the execution of printing. The printer 2, which has received the print data and the print command, executes printing of the image of the print data based on the received print command (A43). As a result, a printed matter is generated. The supporting program 42 further notifies the general-use printing program 41 that the transmission of the print data has been completed.

The transmission of the print data and the like to the printer 2 may be performed by the general-use printing program 41. In other words, the supporting program 42 may pass the generated print data to the general-use printing program 41 so that it is transmitted from the PC 1 to the printer 2 being designated as the destination. The general-use printing program 41 transmits the print data received from the supporting program 42 to the printer 2.

On the other hand, when it is determined that printing is to be canceled in the sheet determination process of A35 (alt: [Cancel]), the supporting program 42 passes information to cancel the print job to the general-use printing program 41 (A44). A44 is an example of a cancellation process. As a result, the general-use printing program 41 cancels the print job based on the print instruction received in A32, and terminates the process of printing.

Figure 3:
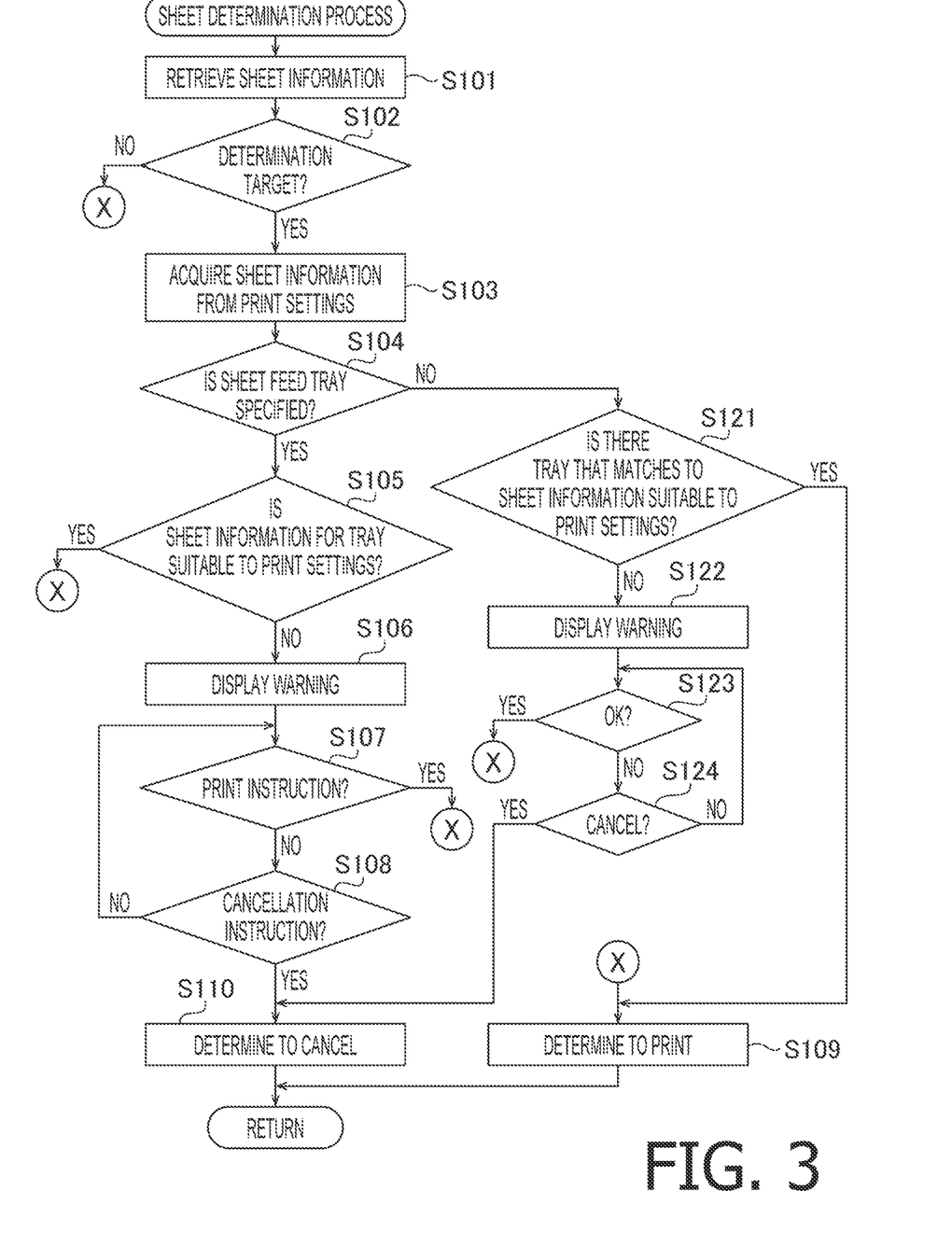
FIG. 3 is a flowchart of the sheet judgment process.

Next, the sheet determination process performed by the supporting program 42 according to the present embodiment will be described with reference to a flowchart in FIG. 3. The sheet determination process is a process executed by the CPU 11 of the PC 1 in A35 in FIG. 2.

In the sheet determination process, the CPU 11 retrieves the sheet information stored in A14 of FIG. 2 (S101). The information to be retrieved in S101 is the information included in the capability information acquired from the printer 2 in A13 of FIG. 2, and is the information about the sheet set in each tray of the printer 2.

Then, based on the retrieved information, the CPU 11 determines whether or not the sheet information is subject to the determination (S102). When all the sheets set in the printer 2 are, for example, normal sheets or recycled sheets and the sheet size is a fixed size such as the A4 size, the loss of the user is likely to be small even if the sheet is wasted due to printing that does not match to the size. When the sheets are assumed to be inexpensive, since it is more likely that image overflow and reprinting will be tolerated, it is preferable to complete printing as soon as possible and output the print results.

When it is judged that the current printing is not the target of the determination (S102: NO), the CPU 11 makes a determination of "print" (S109) and terminates the sheet determination process. When the sheet type of the sheets set in the printer 2 is the plain sheets or the recycled sheets and the sheet size is the fixed size such as the A4 size or the B5 size (S102: NO), the CPU 11 makes a negative decision "NO" in S102. When the sheet type is not the target of the determination, the printer makes a determination of "print" without executing S103 onward, so that the print result can be output at an early stage.

On the other hand, when the printer 2 is loaded with sheets which are likely to be expensive, it is not desirable to waste the sheets by printing on the sheets of a unsuitable size. For example, when the sheet type is a thick sheet, a postcard, a sticker sheet, an OHP sheet, a cloth, and the like, or when the sheet size is a postcard size or an envelope size, the sheets are likely to be more expensive than a fixed size of the normal sheet or the recycled sheet. A sheet size that indicates the postcard size or the envelope size is an example of a particular size that indicates a high price. The sheet type indicating the thick sheet, the postcard, the sticker sheet, the OHP sheet, and the cloth is an example of a particular type indicating a high price. When the sheet information of the sheet set in the printer 2 includes at least one sheet of which sheet type is neither the normal sheet nor the recycled sheet, or of which sheet size is neither the A4 size, the A5 size, the B4 size, nor the B5 size, the CPU 11 makes affirmative determination "YES" in S102.

When it is determined that the sheet information is the target of the determination (S102: YES), the CPU 11 acquires the sheet information included in the print settings from the execution instruction received from the general-use printing program 41 in A34 of FIG. 2 (S103). Step S103 is an example of a second acquisition process, and the sheet information acquired in S103 is an example of second sheet information. The sheet information includes, as an example, the sheet size information and the sheet type information. The print settings acquired in S103 are, for example, the settings designated by the user in A22 of FIG. 2.

Further, the CPU 11 determines whether or not the sheet feed tray is explicitly specified in the print settings based on the information acquired in S103 (S104). When it is determined that the sheet feed tray is specified (S104: YES), the CPU 11 extracts sheet information stored in association with the specified sheet feed tray from the sheet information retrieved in S101. Then, the CPU 11 determines whether the relationship between the extracted sheet information and the sheet information acquired in S103 is suitable or not (S105). Step S105 is an example of a determination process. When the number of sheet feed trays provided to the printer 2 is only one, the CPU 11 makes an affirmative decision "YES" in S104 and executes the determination in S105 for the tray.

The CPU 11 determines the suitability of the sheet size, for example, by comparing the sheet size included in the sheet information retrieved in S101 with the sheet size included in the sheet information acquired in S103. For example, when the sheet size included in the sheet information acquired in S103 is a fixed size, which is a particular size, and does not match the sheet size included in the sheet information retrieved in S101, the CPU 11 determines that the sheet size is unsuitable in S105.

If the sheet size is inappropriate, there is a possibility that the image will overflow from the sheet, the possibility of unintended printing by the user is increased. According to the present embodiment, since the suitability of the sheet size is determined, there is a high possibility of avoiding unintended printing by the user. It is noted that match of the sheet size means both the vertical and horizontal sizes of the sheet match. When the differences in sheet sizes are within a particular range for both vertical and horizontal sizes, for example, when the size is the A4 size or the Letter size, the CPU 11 may determine that the two sizes are suitable.

When the sheet size included in the sheet information acquired in S103 is not a predefined fixed size but a user-defined size that is defined by the user, the CPU 11 compares the sheet information based on the numerical values of the defined size. Further, when the sheet size included in the sheet information retrieved in S101 is expressed as numerical values, the sheet information is compared based on the numerical values. For example, the CPU 11 determines that the sheet sizes are unsuitable when the difference between the numerical values indicating the vertical and horizontal lengths corresponding to the sheet size included in the sheet information acquired in S103 and the numerical values indicating the vertical and horizontal lengths corresponding to the sheet sizes included in the sheet information retrieved in S101 are outside the particular range for at least one of the vertical and horizontal lengths. If the difference is outside the specified range, the sheet is considered unsuitable. When the sheet type is a roll sheet, the CPU 11 only needs to determine the suitability of the sheet size in the horizontal direction (also called sheet width).

The CPU 11 may also determine the suitability of the sheet type by comparing the sheet type included in the sheet information retrieved in S101 with the sheet type included in the sheet information acquired in S103. For example, when the sheet types of both sheet information do not match, the CPU 11 determines the sheet type to be unsuitable in S105.

When it is determined that the sheet information of printer 2 does not match the sheet information of the print settings (S105: NO), the CPU 11 displays a warning message on the user IF 13 (S106). Step S106 is an example of a warning process. The process of displaying a warning message is an example of a warning process.

Figure 4:
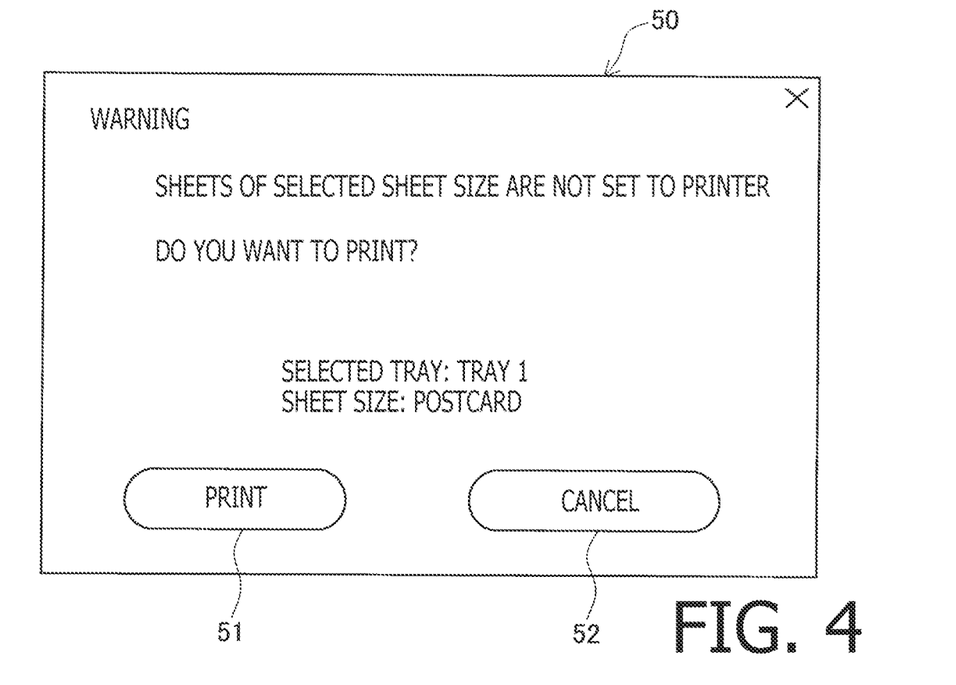
FIG. 4 shows an example of a warning message.

In S106, for example, as shown in FIG. 4, the CPU 11 displays a warning message 50 to inform the user that the printer 2 is not loaded with sheets that march to the sheet size selected in the print settings. The warning message 50 includes a print button 51 to receive an instruction to print as is, and a cancel button 52 to receive an instruction to cancel printing. The warning message 50 may also display information on the tray and/or sheet size selected in the print settings.

Then, the CPU 11 determines whether or not an operation to the print button 51 has been received (S107). When it is determined that the operation to the print button 51 is not received (S107: NO), the CPU 11 determines whether or not the operation to the cancel button 52 is received (S108). When it is determined that the operation to the cancel button 52 has not been received (S108: NO), the CPU 11 waits until the operation to either the print button 51 or the cancel button 52 is received.

When it is determined that the operation to the print button 51 is received (S107: YES), the CPU 11 determines that printing is to be performed (S109) and terminates the sheet determination process. On the other hand, when it is determined that the operation to the cancel button 52 is received (S108: YES), the CPU 11 determines that cancelation is to be performed (S110) and terminates the sheet determination processing. After the sheet determination process is completed, the process proceeds to A41 or A44 based on the judgment result, as shown in FIG. 2.

When it is determined that the cancellation is to be performed in the sheet determination process, the print job is canceled in A44 in FIG. 2. Since a print job can be cancelled at the time of a warning, it is ensured that unintended printing by the user on the printer can be avoided.

When the sheet size included in the sheet information received in S103 is a user-defined size, the CPU 11 may make an affirmative decision "YES" in S105 regardless of the relationship between the sheet sizes. There is a case where the sheet size that can be set in the printer 2 does not include the user-defined size. In such a case, the user needs to set a size close to the user-defined size in the printer 2, making it difficult to accurately determine the match of sheet sizes. When the sheet size is the user-defined size, the CPU 11 determines that the sheet size of the print setting is suitable and does not warning the user, thereby avoiding confusion for the user.

On the other hand, when it is determined that the sheet feed tray is not specified (S104: NO), the CPU 11 determines whether there is a tray that matches the sheet information of the print setting among the sheet information of the printer 2 retrieved in S101 (S121). When the printer 2 has a plurality of sheet feed trays and an automatic feed tray is selected in the print settings, the CPU 11 determines in S104 that no sheet feed tray is specified.

When a print command containing a print setting in which the automatic feed tray is selected is received, the printer 2 automatically determines the sheet tray to be used among installed sheet trays based on the sheet size and other information in the print setting. Since the supporting program 42 has obtained the sheet information for each tray of the printer 2, the supporting program 42 can compare all the obtained sheet information with the sheet information of the print settings to determine the suitability of the sheet. When the printer 2 receives a print command in which the automatic feed tray is selected and there is no tray with sheet that is suitable to the sheet information contained in the print settings, the printer 2 may determine that an error has occurred and not execute printing.

When it is determined that there is no tray to which the sheet information conforms (S121: NO), the CPU 11 displays a warning message on the user IF 13 (S122). Step S122 is an example of a warning process. The process of displaying a warning message is an example of a process of providing a warning.

Figure 5:
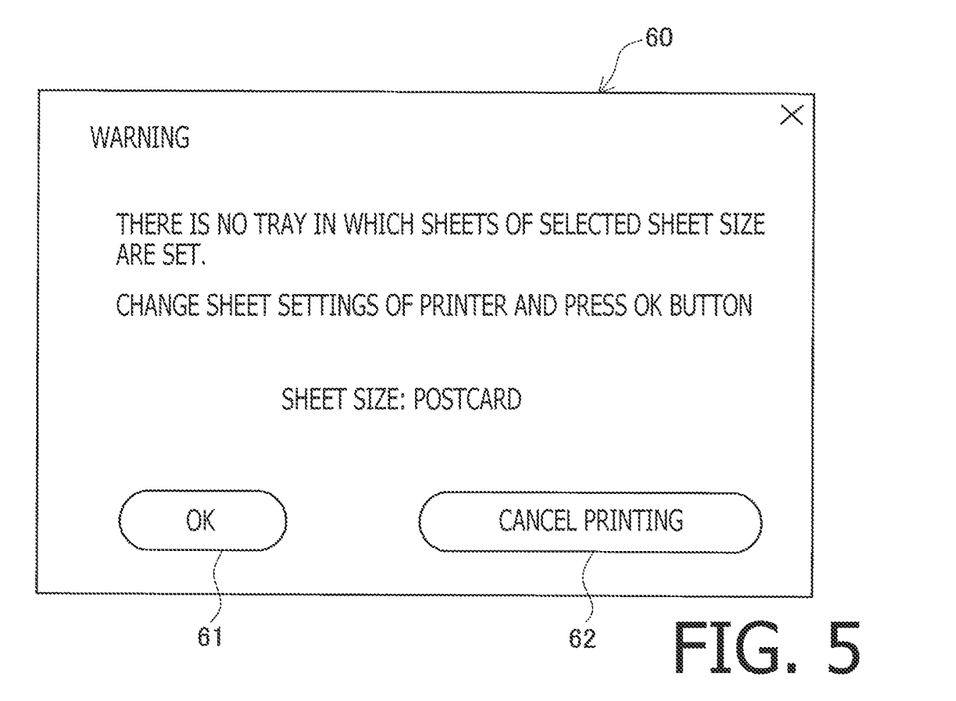
FIG. 5 shows another example of a warning message.

In S122, for example, as shown in FIG. 5, the CPU 11 displays a warning message 60 which informs the user that there is no tray loaded with the sheets that match to the sheet size selected in the print settings. The warning message 60 includes an OK button 61 to receive instructions to print after changing the settings and the like of the printer 2, and a cancel button 62 to receive instructions to cancel printing. In the warning message 60, information on the sheet size set in the print settings may be displayed.

Then, the CPU 11 determines whether or not the operation to the OK button 61 has been received (S123). When it is determined that the operation to the OK button 61 has not been received (S123: NO), the CPU 11 determines whether or not the operation to the cancel button 62 has been received (S124). When it is determined that the operation to the cancel button 62 has not been received (S124: NO), the CPU 11 waits until the operation to either the OK button 61 or the cancel button 62 is received.

When it is determined that there is a tray of which size is suitable (S121: YES), or when it is determined that the operation to the OK button 61 is received (S123: YES), the CPU 11 determines that printing is to be performed (S109) and terminates the sheet determination process. On the other hand, when it is determined that the operation to the cancel button 62 is received (S124: YES), the CPU 11 determines that cancelation is to be performed (S110) and terminates the sheet determination process. After the sheet determination process is completed, the process proceeds to A41 or A44 based on the determination result, as shown in FIG. 2.

According to the present embodiment, since the supporting program 42 obtains the sheet information set for each tray as the capability information of the printer 2, appropriate warnings can be given even when the automatic feed tray is set as the print setting. In addition, by executing the sheet determination process before generating print data and providing warnings according to the results, a print job can be canceled before generating print data, thus avoiding wasteful generation of print data.

Instead of displaying the warning messages 50 and 60 by itself in S106 or S122, the supporting program 42 may pass the information of the warning to the OS 21 or the general-use printing program 41 and instruct the OS 21 or the general-use printing program 41 to give the warning. In this case, the process of passing the warning information is an example of a process of providing a warning. The warning is not limited to the display of warning messages 50, 60, and the like, but may also be an audio warning, or a combination of display and audio.

As described in detail above, according to the supporting program 42 of the present embodiment, the PC 1 acquires the sheet information that the printer 2 has when displaying a setting screen that receives information on detailed settings. Further, when there is a printing instruction to the general-use printing program 41, the PC 1 compares the sheet information obtained from the printer 2 with the sheet information included in the print settings for the printing instruction to determine suitability. Further, when the supporting program 42 determines that the sheets are unsuitable, the supporting program 42 warns the user before transmitting the print data, so that the user can be expected to input information to avoid printing that print data, thus increasing a possibility of avoiding unintended printing by the user.

Further, since the supporting program 42 according to the present embodiment obtains the sheet information from the printer 2 when displaying the setting screen of the detailed settings, which can be displayed even before the print instruction, earlier completion of the process after accepting the print instruction can be expected compared to the case where the sheet information is obtained from the printer 2 when the print instruction is received.

The embodiment disclosed herein are merely an example and does not limit the embodiment of the present disclosure in any way. Therefore, the technology disclosed herein can naturally be improved and transformed in various ways within the scope not deviating from the gist thereof. For example, the device connected to the PC 1 is not limited to a printer, but can be a multifunctional peripheral, a copier, a fax machine, or any other device having a printing function. The number of printers connected to the PC 1 is not necessarily limited to the example shown in the drawings, but can be two or more.

For example, the warning messages shown in the drawings are all examples and are not limited to those as shown. For example, there may be no button to receive printing or cancellation. For example, the supporting program 42 may display a warning message and then cancel printing when it is determined that the print is unsuitable. Alternatively, the supporting program 42 may transmit the print data to the printer 2 after displaying a warning message when the printer 2 is equipped with a function of cancelling the received print, for example, even if it is determined unsuitable. However, by receiving the user's instructions in the warning message, it is easier to reflect the user's intentions than to uniformly cancel or send the data.

For example, the warning message may receive changes to the print settings. The warning message may not display the sheet information. Further, the warning message may display the sheet type information.

According to the present embodiment, the sheet information includes the sheet size information and the sheet type information, but the sheet information may include either of the same. The sheet information may also include information other than the sheet size information and sheet type information.

Further, for example, according to the present embodiment, in S102 of the sheet determination process, it is determined whether or not to the sheets are targets to be determined depending on the sheet size or sheet type, but this determination may be omitted. In other words, all printing instructions can be determined regardless of the sheet size or sheet type.

For example, according to the present embodiment, it is determined that the sheet is unsuitable when the sheet sizes do not match, but the sheet may be determined to be suitable when the difference in sheet sizes is within a particular range, or when the sheet size of the sheets loaded to the printer 2 is larger than the sheet size of the print settings. Alternatively, it is not necessary to make a determination based on the sheet type. In other words, the supporting program 42 may determine that the sheet size is compliant when the sheet is compliant. Further, for example, according to the present embodiment, when the sheet size of the print settings is a user-defined size, the sheet may be determined to be conforming even if the sheet size does not match, but the present embodiment should not be limited to such a configuration.

For example, according to the present embodiment, the sheet determination process is performed before the print data is generated, but it may be performed after the print data is generated. For example, the supporting program 42 may perform the sheet determination processing after generating the print data but before sending the print data to the printer 2. In that case, in the sheet determination process, the supporting program 42 may compare the size of an image represented by the print data in addition to comparing the sheet information of the printer 2 and the sheet information of the print settings.

When the supporting program 42 obtains the sheet information from the printer 2 based on a previous printing instruction or the like, the supporting program 42 may keep the obtained sheet information stored in the memory 12. In other words, when the sheet information is already stored in the memory 12 at a time when the instruction for detailed settings is received, the information as stored may be used.

In the present embodiment, only the printing operation is described in detail as the operation of the supporting program 42, but the supporting program 42 may execute other operations in addition. The program that executes the processing according to the present embodiment is not limited to the supporting program 42, but can be any program that receives instructions from the OS 21 or the general-use printing program 41 when printing is performed using the general-use printing program 41. For example, such a program can be a printing workflow application (i.e., Print workflow) for which Microsoft Corporation has released specifications.

The execution timing of the supporting program 42 is not limited to the examples in the embodiment. For example, the supporting program 42 may be executed with a direct execution instruction from the OS 21, or the supporting program 42 may be a resident program. In the case where the supporting program 42 is a resident program, the supporting program 42 should perform the aforementioned operation upon receiving an execution instruction.

In addition, in any flowchart disclosed in the form, the plurality of processes in any plurality of steps can be executed in any order, or can be executed in parallel, to the extent that there is no inconsistency in the processing content.

The processing disclosed in the embodiment may be executed by a single CPU, multiple CPUs, hardware such as an ASIC, or a combination thereof. In addition, the processing disclosed in the embodiment may be realized in various forms, such as a recording medium in which a program for executing the processing is recorded, or a method.

What is claimed is:

1. A non-transitory computer-readable recording medium for an information processing device which includes a communication interface, a memory and a computer, the information processing device being configured to connect an external device through the communication interface, the external device including a printer, the non-transitory computer-readable recording medium containing computer-executable instructions realizing a supporting program corresponding to the printer connected to the information processing apparatus,
wherein the supporting program is configured to cause the computer to perform:
a setting screen displaying process of displaying a setting screen for receiving an input operation of print settings using a user interface of the information processing device; and
in response to displaying of the setting screen in the setting screen displaying process, a first acquisition process of acquiring first sheet information from the printer through the communication interface, the first sheet information representing information of a sheet the printer uses for printing, and
wherein, when there is a print instruction output from an application program implemented in the information processing device and instructing a general-use printing program implemented, in advance, in an operating system of the information processing device, to perform printing of an image, the supporting program is further configured to cause the computer to perform:
a second acquisition process of acquiring second sheet information included in the print settings for the print instruction and representing information of a sheet included in the print settings;
a determining process of determining suitability of a sheet by comparing the first sheet information acquired in the first acquisition process with the second sheet information acquired in the second acquisition process; and
when it is determined in the determining process that the sheet is unsuitable, a warning process of performing a process for warning using the user interface.

2. The non-transitory computer-readable recording medium according to claim 1,
wherein each of the first sheet information and the second sheet information contains particular information, and
wherein the computer performs determining, in the determining process, that the sheet is unsuitable when the particular information contained in the second sheet information acquired in the second acquisition process does not match the particular information contained in the first sheet information acquired in the first acquisition process.

3. The non-transitory computer-readable recording medium according to claim 1,
further causing the computer to perform:
receiving an operation whether to cancel a print job based on the print instruction or not using the user interface when the process for warning is performed in the warning process; and
a cancellation process of canceling the print job when the operation to cancel the print job is received.

4. The non-transitory computer-readable recording medium according to claim 3,
further causing the computer to perform, when the print instruction is issued:
the determining process before print data representing an image of a print target is generated in accordance with the print instruction; and
the warning process before the print data is generated when it is determined that the sheet is unsuitable in the determining process.

5. The non-transitory computer-readable recording medium according to claim 1,
wherein each of the first sheet information and the second sheet information contains sheet size information, and
wherein, in the determining process, the computer performs determining the suitability of a sheet by comparing the sheet size information contained in the first sheet information with the sheet size information contained in the second sheet information.

6. The non-transitory computer-readable recording medium according to claim 5,
wherein sizes settable as a sheet size contained in the print settings include a fixed size that is a pre-defined size and a user-defined size to be defined by a user,
wherein, when the sheet size information contained in the second sheet information acquired in the second acquisition process is the fixed size, the program causes the computer to perform the warning process before the print data representing the image of the print subject by the print instruction is transmitted to the printer when it is determined that the sheet is unsuitable in the determining process, and
wherein, when the sheet size information contained in the second sheet information acquired in the second acquisition process is the user-defined size, the program causes the computer not to perform the warning process.

7. The non-transitory computer-readable recording medium according to claim 5,
wherein sizes settable as a sheet size contained in the print setting include a fixed size that is a pre-defined size and a user-defined size to be defined by a user,
wherein, when the sheet size information contained in the second sheet information acquired in the second acquisition process is the fixed size, the supporting program causes the computer to determine that the sheet is unsuitable when, in the determining process, the sheet size information contained in the second sheet information acquired in the second acquisition process does not match the sheet size information contained in the first sheet information acquired in the first acquisition process, and
wherein, when the sheet size information contained in the second sheet information acquired in the second acquisition process is the user-defined size, the program causes the computer to determine that the sheet is unsuitable when, in the determining process, a difference between the sheet size information contained in the second sheet information acquired in the second acquisition process and the sheet size information contained in the first sheet information acquired in the first acquisition process is outsize a particular range.

8. The non-transitory computer-readable recording medium according to claim 5,
wherein the print settings include sheet feed tray information,
wherein the printer is configured such that a plurality of sheet feed trays are attached to the printer,
wherein trays settable to the sheet feed tray information includes the plurality of trays having been attached to the printer and an automatic feed tray that is automatically determined by the printer based on the sheet size contained in the print setting,
wherein, in the first acquisition process, the computer acquires the first sheet information for each of the plurality of sheet feed trays attached to the printer,
wherein, when the sheet feed tray contained in the print settings is the tray attached to the printer, the computer determines that the sheet is unsuitable, in the determining process, in response to the sheet size information contained in the second sheet information acquired in the second acquisition process not matching the sheet size contained in the first sheet information corresponding to the sheet feed tray, the sheet feed tray being indicated by sheet feed tray information contained in the print settings of the first sheet information acquired in the first acquisition process, and
wherein, when the sheet tray contained in the print settings is the automatic feed tray, the computer determines that the sheet is unsuitable, in the determining process, in response to the sheet size contained in the second sheet information acquired in the second acquisition process not matching any of sheet sizes contained in the first sheet information corresponding to each of the plurality of sheet feed trays acquired in the first acquisition process.

9. The non-transitory computer-readable recording medium according to claim 5,
wherein the sheet size contained in the first sheet information acquired in the first acquisition process includes a particular size,
wherein, when the sheet size contained in the first sheet information is the particular size, the computer performs the warning process in response to the sheet size being determined to be unsuitable in the determination process, and
wherein, when the sheet size contained in the first sheet information is not the particular size, the computer does not perform the warning process.

10. The non-transitory computer-readable recording medium according to claim 1,
wherein each of the first sheet information and the second sheet information contains sheet type information, and
wherein, in the determination process, the computer determines suitability of a sheet type by comparing sheet type information contained in the first sheet information with the sheet type information contained in the second sheet information.

11. The non-transitory computer-readable recording medium according to claim 10,
wherein the sheet type information contained in the first sheet information acquired in the first acquisition process has a particular type,
wherein, when the sheet type information contained in the first sheet information is the particular type, the computer performs the warning process in response to the sheet type being determined to be unsuitable in the determination process, and
wherein, when the sheet type information contained in the first sheet information is not the particular type, the computer does not perform the warning process.

12. The non-transitory computer-readable recording medium according to claim 1,
wherein, in the warning process, the computer performs the warning process to notify the second sheet information acquired in the second acquisition process using the user interface.

13. A printing system, comprising:
an information processing device including a communication interface, the information processing device being configured to connect an external device through the communication interface;
a printer configured to connect the information processing device through the communication interface as the external device; and
a supporting program executable by a computer of the information processing device and corresponding to the printer that is connected to the information processing device,
wherein the supporting program is configured to perform:

displaying a setting screen for receiving an input operation of print settings using a user interface of the information processing device; and in response to displaying of the setting screen, transmitting an acquisition request for first sheet information that is information of a sheet used for printing to the printer, wherein, when the printer receives the acquisition request, the printer transmits sheet information set to the printer as the first sheet information to the supporting program through the communication interface, wherein, when there is a print instruction output from an application program implemented in the information processing device and instructing a general-use printing program implemented, in advance, in an operating system of the information processing device, to perform printing of an image, the supporting program is configured to perform:

acquiring second sheet information included in the print settings for the print instruction and representing information of a sheet included in the print settings;

determining suitability of a sheet by comparing the first sheet information received from the printer with the second sheet information; and when it is determined that the sheet is unsuitable, performing a process for warning using the user interface.

* * * * *

UNITED STATES PATENT AND TRADEMARK OFFICE
CERTIFICATE OF CORRECTION

| | | |
|---|---|---|
| PATENT NO. | : 11,650,776 B2 | |
| APPLICATION NO. | : 17/560561 | |
| DATED | : May 16, 2023 | |
| INVENTOR(S) | : Kenju Narita | |

It is certified that error appears in the above-identified patent and that said Letters Patent is hereby corrected as shown below:

On the Title Page

Item (56), FOREIGN PATENT DOCUMENTS should read:
JP 2007-011946A 1/2007

Signed and Sealed this
Fifteenth Day of August, 2023

*Katherine Kelly Vidal*

Katherine Kelly Vidal
*Director of the United States Patent and Trademark Office*